United States Patent [19]

van Nistelrooij et al.

[11] Patent Number: 5,113,690
[45] Date of Patent: May 19, 1992

[54] ELECTROMAGNETIC FLOWMETER

[75] Inventors: Petrus N. J. van Nistelrooij, Oss; Aart J. van Bekkum, Hoornaar, both of Netherlands

[73] Assignee: Krohne AG, Basle, Switzerland

[21] Appl. No.: 572,984

[22] PCT Filed: Jan. 4, 1990

[86] PCT No.: PCT/EP90/00018
§ 371 Date: Sep. 14, 1990
§ 102(e) Date: Sep. 14, 1990

[87] PCT Pub. No.: WO90/07694
PCT Pub. Date: Jul. 12, 1990

[30] Foreign Application Priority Data

Jan. 5, 1989 [NL] Netherlands .................. 8900021

[51] Int. Cl.⁵ .................................................. G01F 1/58
[52] U.S. Cl. .................................. 73/861.12; 29/602.1
[58] Field of Search ...................... 73/861.11, 861.12; 403/28, 30, 274, 279, 281, 404; 29/602.1

[56] References Cited

U.S. PATENT DOCUMENTS

| | | | |
|---|---|---|---|
| 2,650,683 | 9/1953 | McPhee et al. | 403/28 |
| 2,879,584 | 3/1959 | Skobel | 29/602.1 |
| 3,055,465 | 9/1962 | Pulfrich | 403/30 |
| 3,610,040 | 10/1971 | Wada | 73/861.12 |

*Primary Examiner*—Reinhard J. Eisenzopf
*Assistant Examiner*—E. Shopbell
*Attorney, Agent, or Firm*—Townsend and Townsend

[57] ABSTRACT

An electromagnetic flowmeter comprises a pressure-resistant measurement tube made of a heat-resistant material and a stainless steel casing which surrounds the measurement tube. Disposed in a sealed space between these two parts is a magnetic device comprising at least pole pieces and windings, and one or more measuring electrodes are arranged in the measurement tube. To ensure effective sealing even at high temperatures by simple means, at least one end of the stainless steel casing is bent to form a concentric inner ring and a steel compensation ring surrounds the inside of the inner ring. The steel from which the compensation ring is made has a coefficient of thermal expansion which is between that of the material of the measurement tube and that of the stainless steel of the casing.

7 Claims, 2 Drawing Sheets

ELECTROMAGNETIC FLOWMETER

BACKGROUND OF THE INVENTION

The present invention relates to an electromagnetic flowmeter having a pressure resistant measurement tube made of a heat-resistant material and surrounded by a stainless steel casing. A magnetic device comprising at least pole pieces and windings is disposed in a sealed spaced between these two parts and one or more measuring electrodes are arranged in the measurement tube. Electromagnetic flowmeters of this type are known from German patent DE 34 23 921 A1.

Flowmeters of the aforementioned type are used to measure the rate of fluid flow and are utilized in a variety of fields including, for example, the food industry.

It is essential that the measurement tube is compression resistant, non-corrosive, structurally rigid and also a good electrical insulator. In particular ceramic materials, e.g. $Al_2O_3$, exhibit these characteristics, though other materials, such as heat resistant plastic, are also suitable. Generally, the casing is made of stainless steel, usually stainless austentite steel (1.4301) which has highly non-corrosive properties and is readily deformable by deep-drawing. The latter property is important for the manufacture of flowmeters with steel casings because it results in low material costs. For large production runs casings of this type using austentite steel can also be cast.

A drawback of the stainless steel, especially austentite steel, is that it has a significantly higher coefficient of thermal expansion than materials such as ceramic or plastic, of which the measurement tube is made. Moreover it is very difficult to attach a stainless steel casing to a ceramic or plastic tube.

Especially when subjected to a variety of uses, when fluids must be measured over a wide range of temperatures, it is important to provide a cost effective and reliable seal between the measurement tube and the stainless steel casing. Moreover, the seal must be non-corrosive and the casing must be of the type that can be attached to the measurement tube in a cost-effective manner.

The seal of the flowmeter disclosed in German patent publication DE 34 239 21 A1 employs an expensive O-ring and the attachment occurs when the space surrounding the measurement tube is sealed. An O-ring seal has the further disadvantage that its non-corrosive properties are determined by the material of the O-ring.

SUMMARY OF THE INVENTION

An object of the present invention is therefore to eliminate the foregoing drawbacks by providing an effective, simple and cost-effective seal between the materials of the measurement tube and the stainless steel casing. The seal should be as durable as the stainless steel casing, and it should function over a wide temperature range and up to the relatively higher operating temperatures.

The objective is achieved with an electromagnetic flowmeter, in which at least one end of the stainless steel casing is bent to form a concentric inner ring. A steel compensation ring surrounds and is affixed to the inner ring; the steel of the compensation ring has a high coefficient of thermal expansion which falls between those for the materials of the measurement tube and the stainless steel casing.

For a flowmeter with a stainless austentite steel casing the compensation ring is preferably made of a stainless ferritic steel.

BRIEF DESCRIPTION OF THE DRAWINGS

An embodiment of the present invention is described in greater detail with reference to the drawings, in which.

DESCRIPTION OF THE PREFERRED EMBODIMENT

Figure 1:
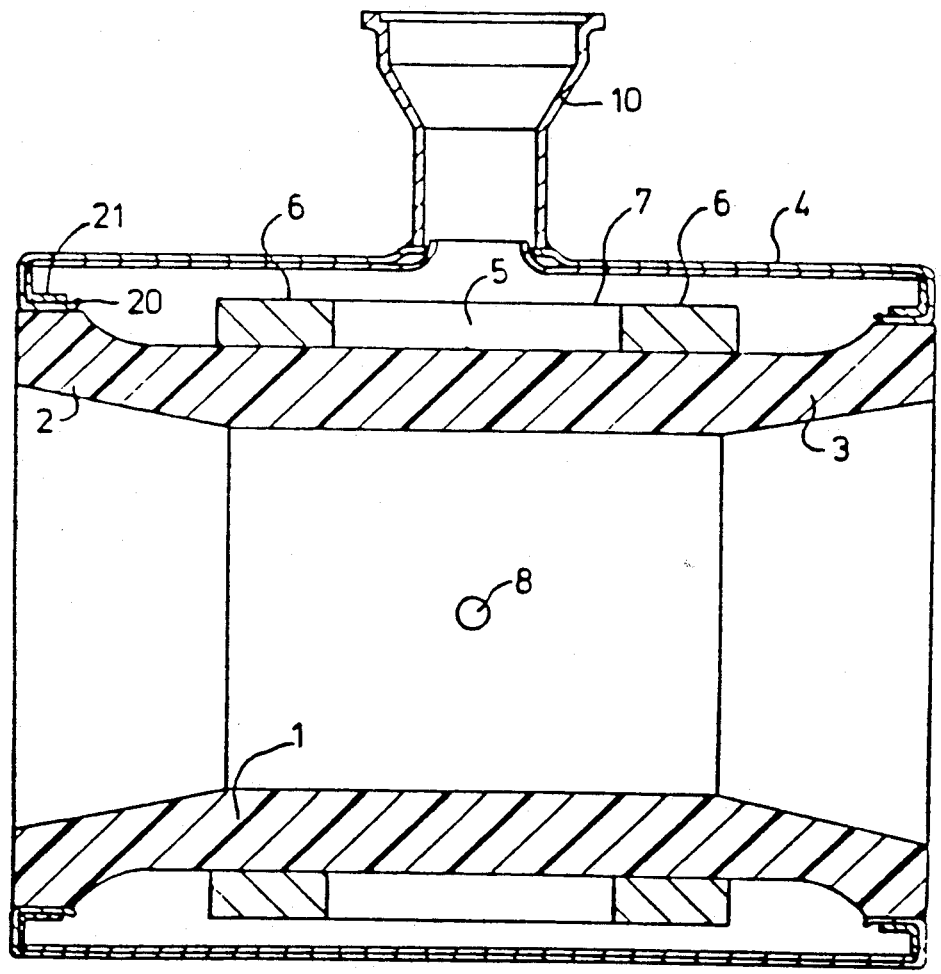
FIG. 1 is a longitudinal cross-section of a flowmeter in accordance with the present invention.

In a preferred embodiment the inventive flowmeter, shown in FIG. 1 in longitudinal cross-section, includes a measurement tube 1, the ends of which define two slightly radially outwardly flared flanges 2, 3. Both ends of measurement tube 1 are connected to a conduit through which the fluid to be measured flows. Measurement tube 1 is constructed of a ceramic ($Al_2O_3$) or other suitable material, e.g. plastic which is compression resistant, non-corrosive, structurally rigid and a good electrical insulator. Measurement tube 1 is surrounded by a stainless steel casing 4, normally made of austentite steel. In the sealed spaced between steel casing 4 and measurement tube 1 is a magnetic device for measuring the fluid flow by magnetic induction. Amongst others, the magnetic device consists of pole pieces 5 and windings 6 which are placed about the tube 1 and a yoke 7 which completes the magnetic circuit. Two measuring electrodes 8 are mounted on measurement tube 1 on an axis which is perpendicular to the symmetry surface of pole pieces 5. Wiring for the sensors, not shown in the drawing, passes outwardly through an opening 10. In flowmeters known from the prior art the seal is achieved by a welded joint between the stainless steel casing and the measurement tube together with a coating applied to the inner space or a specially designed O-ring.

In order to create a simple and cost effective seal between measurement tube made, for example, of ceramic or plastic, and stainless steel casing 4, which is operative at high temperatures and over a wide temperature range, at least one end of steel (e.g. 1.4301) casing 4 is bent inwardly twice to form a concentric inner ring or casing ring 20.

Figure 2A:
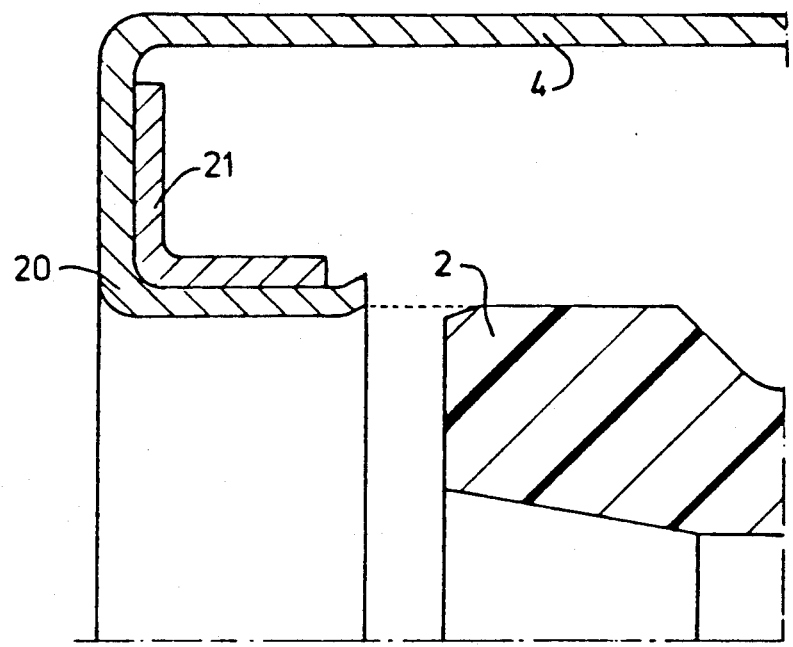
FIGS. 2a and 2b show a section of the stainless steel casing with an inner ring and a compensation ring disposed therein, before and after being attached to the measurement tube.
Figure 2B:
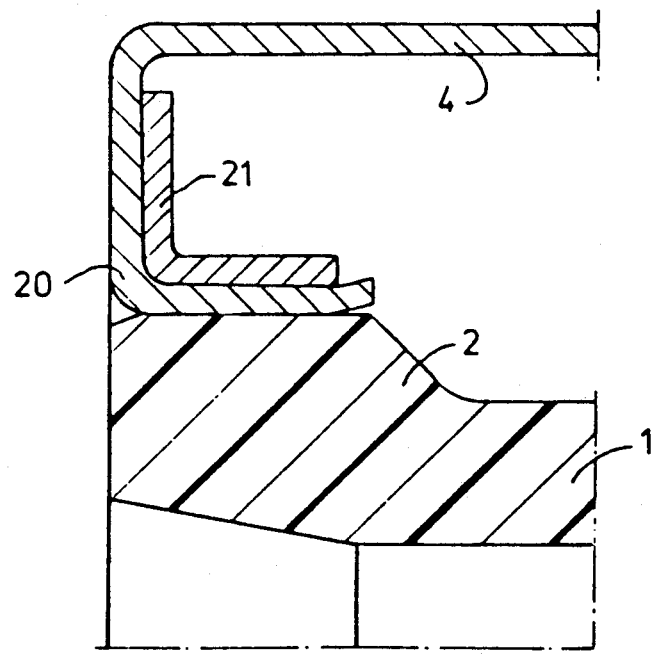

FIGS. 2a and 2b show a section of the casing ring 20 before and after it is pressed onto flange 2 of measurement tube 1.

The stainless austentite steel casing 4 undergoes multiple deep-drawing steps. An independent, compensation ring 21 made of stainless ferritic steel (e.g. 1.4016) is also deep drawn. Prior to the final deep drawing step for stainless austentite steel casing 4, compensation ring 21 is placed inside the bent inner casing ring 20. Next, compensation ring 21 and the casing are simultaneously precision dimensioned, such that inner ring 20, as clearly illustrated in FIG. 2a, has a precise, predetermined negative tolerance relative to flange 2 of measurement tube 1 made, for example, of ceramic. Lastly, casing 4 together with the inlaid compensation ring 21 are pressed onto flange 2 of measurement tube 1, as shown in FIG. 2b.

A significant advantage of this embodiment is that the material of which compensation ring 21 is made, i.e. stainless ferritic steel, has a linear coefficient of thermal expansion of about $10 \times 10^{-6}$, as opposed to austentite steel which has a coefficient of thermal expansion of 18-10, and ceramic with a coefficient of $8.5 \times 10^{-6}$. When variations in expansion occur between compensation ring 21, casing 4 and ceramic measurement tube 1 as a result of a temperature increase, compensation ring 21 expands less under temperature increases than inner ring 20. Consequently, at higher temperatures compensation ring 21 clamps more tightly onto inner ring 20. By selecting the appropriate elasticity ratios for casing 4, compensation ring 21 and measurement tube 1, it is possible even at higher temperatures to maintain the pressure with which compensation ring 21 forces inner ring 20 against measurement tube 1.

Accordingly, the flowmeter remains operative even at higher operating temperatures, e.g. 300° C., which is not the case for known flowmeters. Conventional flowmeters were operable only up to a temperature of 120° C., because at higher temperatures a proper seal could no longer be ensured. The maximum operating temperature is selected so that the measurement tube 1 remains properly attached to the steel casing. In such case the seal will remain elastic over a temperature range of between $-20°$ C. and 300° C.

We claim:

1. An electromagnetic flowmeter with a compression-resistant measurement tube (1) made of a heat-resistant material and a casing (4) made of stainless steel and surrounding the measurement tube (1), a sealed space being defined between them, a magnetic device disposed in the sealed space having at least pole pieces (5) and windings (6), and one or more measuring electrodes (8) applied to the measurement tube (1), characterized in that at least one end of the casing (4) made of stainless steel is bent to form a concentric inner ring (20), and a compensating ring (21) surrounding and fixedly engaging the inner ring (20), the compensating ring (21) being made of steel having a thermal coefficient of expansion which is between the thermal coefficient of expansion of the material for the measurement tube (1) and the thermal coefficient of expansion for the stainless steel of the casing (4).

2. A flowmeter according to claim 1 wherein the casing (4) is made of austentite steel, characterized in that the compensating ring (21) is made of stainless, ferritic steel.

3. A flowmeter according to claim 1, characterized in that the casing (4) made of steel and the compensating ring (21) made of steel are separately deep drawn, in that the compensating ring (21) is placed over an inside of the inner ring (20) of the casing (4) prior to the last deep drawing step, in that the casing (4) is deep drawn to a dimension to provide a negative tolerance relative to an exterior diameter of the measurement tube (1), and in that the casing (4) together with the compensating ring (21) are pressed onto the measurement tube (1) at room temperature.

4. A flowmeter according to claim 1, characterized in that the relative elasticities of the casing (4), the compensating ring (21) and the measurement tube (1) are selected so that the compensating ring (21) presses the inner ring (20) of the casing (4) against flanges (2, 3) of the measurement tube (1) and ensures a seal even at higher temperatures.

5. A flowmeter according to claim 1, characterized in that the measurement tube (1) is constructed of a ceramic material.

6. A flowmeter according claim 1, characterized in that the measurement tube (1) is constructed of a plastic material.

7. A flowmeter according to claim 1, characterized in that the temperature of the materials to be measured and at which the flowmeter is operative is between $-20°$ C. and 300° C.

* * * * *